(12) United States Patent
Azizan et al.

(10) Patent No.: US 11,387,645 B2
(45) Date of Patent: Jul. 12, 2022

(54) APPARATUS AND METHOD FOR ADAPTIVE ACTIVE CURRENT LIMIT PROTECTION

(71) Applicant: MOTOROLA SOLUTIONS, INC., Chicago, IL (US)

(72) Inventors: Muhamad Ridzuan Azizan, Baling (MY); Chen Kok Yeoh, Bukit Mertajam (MY); Wai Mun Lee, Ipoh (MY); Mohd Faisal Abdullah, Gelugor (MY); Kow Chee Chong, Bayan Lepas (MY); Macwien Krishnamurthi, Shah Alam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 288 days.

(21) Appl. No.: 16/869,620

(22) Filed: May 8, 2020

(65) Prior Publication Data
US 2021/0351586 A1    Nov. 11, 2021

(51) Int. Cl.
*H02H 3/00* (2006.01)
*H02H 9/02* (2006.01)
*H02H 3/08* (2006.01)
*H02H 1/00* (2006.01)

(52) U.S. Cl.
CPC ............ *H02H 9/02* (2013.01); *H02H 1/0007* (2013.01); *H02H 3/08* (2013.01)

(58) Field of Classification Search
CPC ........... H02H 9/02; H02H 3/08; H02H 1/0007
USPC .......................................................... 361/87
See application file for complete search history.

(56) References Cited

U.S. PATENT DOCUMENTS

| | | | |
|---|---|---|---|
| 3,708,694 A | 1/1973 | Evans | |
| 4,945,262 A | 7/1990 | Plasecki | |
| 5,809,519 A | 9/1998 | Lee | |
| 5,831,351 A | 11/1998 | Khosrowpour et al. | |
| 6,927,555 B2 | 8/2005 | Johnson | |
| 7,424,312 B2 | 9/2008 | Pinder et al. | |
| 7,952,321 B2 | 5/2011 | Spartano | |
| 8,909,173 B2 | 12/2014 | Harmke | |
| 9,166,442 B1 * | 10/2015 | Belch ....................... H02J 7/02 |

(Continued)

FOREIGN PATENT DOCUMENTS

EP    3226368    10/2017

OTHER PUBLICATIONS

"Integrated Voltage Limiters for Automotive Applications." Maxim, https://www.maximintegrated.com/en/app-notes/index.mvp/id/3895, Sep. 13, 2006; 4 pages.

(Continued)

*Primary Examiner* — Jared Fureman
*Assistant Examiner* — Lucy M Thomas

(57) ABSTRACT

An apparatus and method for providing a selectively reduced voltage to a portable electronic device are disclosed. When a determination is made that an output voltage from a voltage source exceeds a predefined maximum permitted voltage, a plurality of circuitries, including an adaptive active current limiting circuitry, are enabled in order to derive the reduced voltage from the output voltage. The reduced voltage is at least at or below the predefined maximum permitted voltage and is supplied to the portable electronic device by battery circuitry that includes the active current limiting circuitry.

19 Claims, 5 Drawing Sheets

(56) References Cited

U.S. PATENT DOCUMENTS

| | | | |
|---|---|---|---|
| 9,465,761 B2 | 10/2016 | Decesaris et al. | |
| 9,254,018 B2 | 12/2016 | Sultenfuss et al. | |
| 2010/0066311 A1* | 3/2010 | Bao .................. | H02J 7/0071 320/162 |
| 2016/0049815 A1 | 2/2016 | Wu et al. | |

OTHER PUBLICATIONS

Ultra-Small, Overvoltage Protection/Detection Circuits. MAX16010-MAX16014, 2015; 12 pages.

Lee, Wai Mun et al.: "ADynamic Battery Voltage Restriction for Hazardous Environments", U.S. Appl. No. 16/490,816, filed Oct. 2, 2019, all pages.

Alfaro, Javier et al.: "Asynchronous Multi-Purpose Battery Interface", U.S. Appl. No. 16/823,022, filed Mar. 18, 2020, all pages.

\* cited by examiner

APPARATUS AND METHOD FOR ADAPTIVE
ACTIVE CURRENT LIMIT PROTECTION

BACKGROUND

Feature-rich portable electronic devices require ever increasing amounts of energy from batteries in terms of higher peak load currents and higher average load currents. For example, radios have evolved from simple analog devices with peak transmission power demands to multi-function computing systems in which different software-controlled modes have different peak current demands. Battery packs and battery cells thereof are growing in terms of capacity and increased voltage ratings due to the introduction of improved battery chemistries and a demand for higher power and higher capacities.

Hazardous locations are sometimes defined as those places where fire or explosion hazards may potentially exist due to flammable gases, flammable liquid-produced vapors, combustible liquid-produced vapors, combustible dusts, or ignitable fibers or filings that are present in the air in quantities sufficient to produce explosive or ignitable mixtures. Electrical/electronics equipment that is meant to be installed in such hazardous locations, including land mobile radios and other portable electronic devices, should be specially designed and tested to ensure that they do not initiate any explosion due to arcing contacts or the high surface temperature of the equipment. For example, a radio may be restricted in terms of power consumption or current consumption to satisfy compliance with one or more standards (for example, explosive environment standard or other relevant standard) including Appareils destinés à être utilisés en ATmosphéres EXplosibles (ATEX), Underwriters Laboratories (UL), and International Electrotechnical Commission System for Certification to Standards Relating to Equipment for Use in Explosive Atmospheres (IECEx).

With the above in mind, it will also be noted that the maximum allowable capacitance listed in the HAZardous LOCation (HAZLOC) standards for portable electronic devices is inversely related to the voltage rating for the battery being used.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
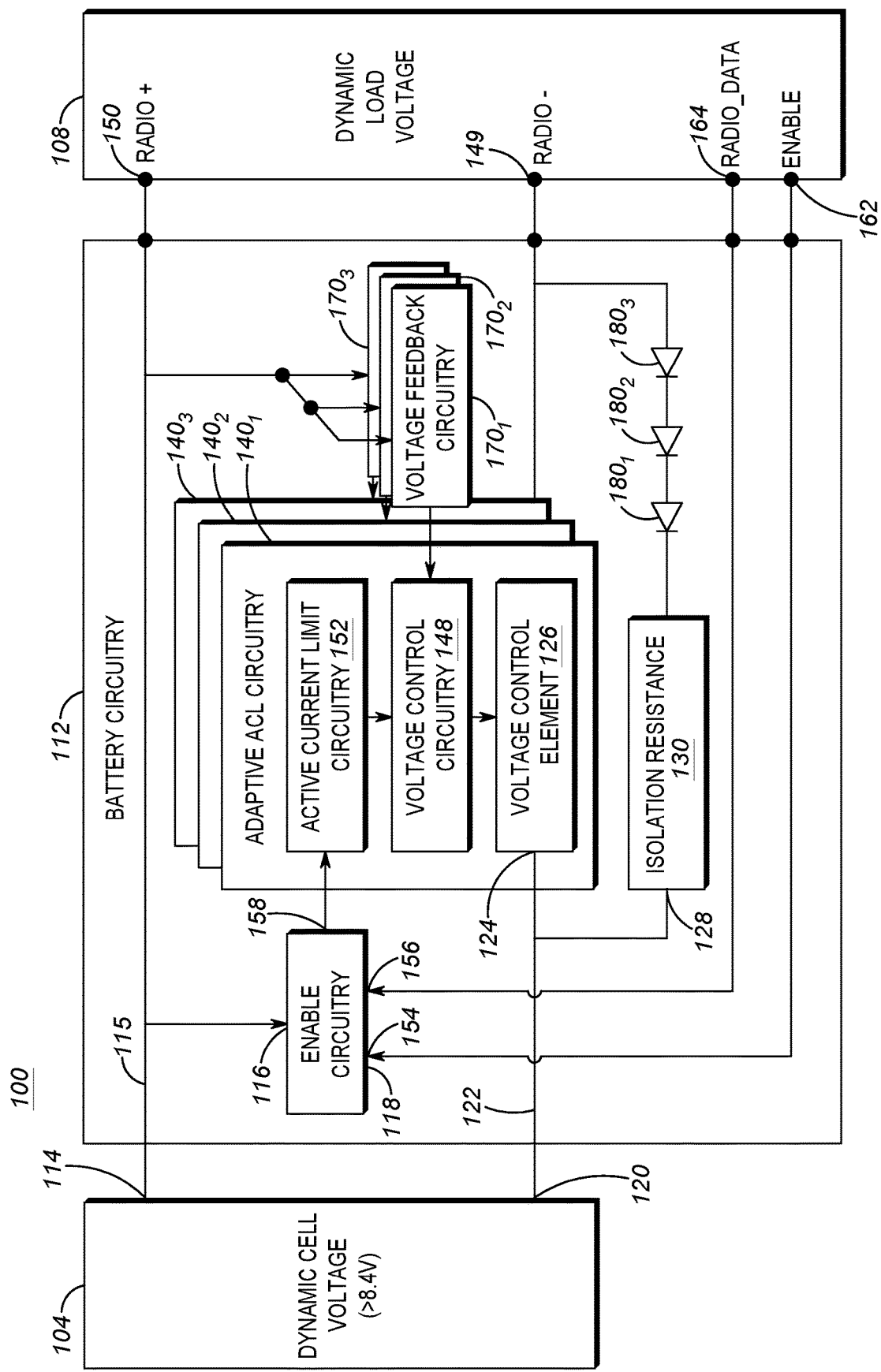
FIG. 1 is a block diagram of an electronics apparatus in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a method for providing a selectively reduced voltage to a portable electronic device. The method includes making a determination, prior to supplying electrical power from a voltage source to the portable electronic device: that an output voltage from the voltage source exceeds a predefined maximum permitted voltage for operation of the portable electronic device in a hazardous environment; or that the output voltage from the voltage source is at or below the predefined maximum permitted voltage. When the determination is that the output voltage from the voltage source exceeds the predefined maximum permitted voltage: a plurality of circuitries are enabled, including an adaptive active current limiting circuitry, that derives the reduced voltage from the output voltage. The reduced voltage is at least at or below the maximum permitted voltage, and the reduced voltage is supplied to the portable electronic device for this case. For the alternative case where the determination is that the output voltage from the voltage source is at or below the predefined maximum permitted voltage: the output voltage is provided to the portable electronic device without voltage reduction; and the plurality of circuitries become fully turned off.

According to another example embodiment, there is provided an apparatus having a housing to contain a voltage source that provides an output voltage. The apparatus includes a portable electronic device sized to be contained within the housing. The apparatus also includes battery circuitry including enable circuitry and adaptive active current limiting circuitry. The battery circuitry is configured to provide either the output voltage or a reduced voltage. The enable circuitry is electrically connectable to the voltage source, and is configured to make a determination, prior to the battery circuitry supplying electrical power from the voltage source to the portable electronic device. The determination is either that the output voltage from the voltage source exceeds a predefined maximum permitted voltage for operation of the portable electronic device in a hazardous environment; or that the output voltage from the voltage source is at or below the predefined maximum permitted voltage. Adaptive active current limiting circuitry is coupled to the enable circuitry and is configured to be fully turned off when disabled by the enable circuitry. When the enable circuitry determines that the output voltage from the voltage source exceeds the predefined maximum permitted voltage, the adaptive active current limiting circuitry generates the reduced voltage from the output voltage, which is at least at or below the maximum permitted voltage.

Each of the above-mentioned embodiments will be discussed in more detail below, including a discussion of an example system and device architectures of the system in which the embodiments may be practiced, as well as an illustration of processing blocks for achieving an improved technical method, device, and system for adaptive active current limit protection. Example embodiments are herein described with reference to flowchart illustrations and/or block diagrams of methods, circuit schematic diagrams and apparatus (systems) according to example embodiments. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

In this document, various example numerical values are provided for electronic components for at least the reason of facilitating an understanding of various details of example embodiments. For instance, certain resistance and capacitance values are provided for resistors and capacitors respectively. These example component values are not intended to be limiting and will be understood by those skilled in the art to vary as between non-inventively different, specific circuit implementations.

As previously noted, battery packs and battery cells thereof are growing in terms of capacity and increased voltage ratings due to the introduction of improved battery chemistries and a demand for higher power and higher capacities. These increasing voltage ratings may pose a risk for products intended for use in hazardous locations (e.g., so-called "HAZLOC products") and subject to UL div 1 and ATEX standards for operation in hazardous locations. Since the maximum allowable capacitance listed in the HAZLOC standards for portable electronic devices is inversely related to the voltage rating for the battery being used, the increase in the voltage ratings over time means that the maximum capacitance usable for a radio, for example, is decreasing as radio designs are becoming getting more complex. For example, radio designers are continuing to add functional features and connectivity features in terms of application processing, baseband processing, Long Term Evolution (LTE), WiFi™, etc.

In dual-cell battery packs, the voltage ratings for the two cells have been increasing from a maximum voltage rating of 4.2V (resulting in an overall voltage rating of 8.4V for the battery pack) to a maximum voltage rating of 4.5V (resulting in an overall voltage rating of 9V for the battery pack), with a corresponding increase in energy density. In the future, voltage ratings for individual battery cells may reach 4.8V per cell (resulting in an overall voltage rating of 9.6V for a dual-cell battery pack). Increasing battery voltage ratings from 8.4V to 8.8V or, in the future, 9V, 10V, or more, may in general improve the battery capacity (for example, the peak power handling capability) but this higher voltage rating may not be compatible with HAZLOC equipment protection standards.

Advantages and features consistent with this disclosure will be set forth herein with reference to the figures as appropriate.

Referring now to the drawings, and in particular FIG. 1, there is a block diagram of an electronics apparatus 100 in accordance with example embodiments.

The electronics apparatus 100 includes a voltage source 104 and a power-consuming electronics device 108. The electronics apparatus 100 also includes battery circuitry 112 coupled in-between the voltage source 104 and a power-consuming electronics device 108. The power-consuming electronics device 108 may be or include, for example, a land mobile radio designed for operation in a hazardous environment or in a location subject to HAZLOC equipment protection standards.

Regarding the voltage source 104, this may take the form of, for example, a battery pack that may include a multi-cell battery whose combined voltage rating may exceed a predefined maximum permitted voltage for the operation of the power-consuming electronics device 108 in a hazardous environment.

Also, the voltage source 104 includes a first terminal 114 which outputs a voltage over voltage path 115, which is received by input 116 of enable circuitry 118 of the battery circuitry 112. In some examples, the outputted voltage is a voltage above 8.4 V. Also, the voltage source 104 includes a second terminal 120 which is coupled via path 122 to the following that are included within the battery circuitry 112: i) input 124 of voltage control element 126; and a terminal 128 of isolation resistance 130. In some examples, the voltage on the path 122 is about 0 V.

Regarding the battery circuitry 112, this includes three adaptive Active Current Limit (ACL) circuitries $140_1$, $140_2$, $140_3$, each of which are similar to each other, and thus for convenience of illustration only the adaptive ACL circuitry $140_1$ is shown in any detail (in respect of FIG. 1). As will be appreciated by those skilled in the art, HAZLOC equipment protection standards may specify that voltage limiting circuitry include triple redundancy such that the voltage limiting circuitry will be able to reduce a battery voltage supplied at its input by an amount sufficient to drop the voltage on the supply line below the predefined maximum permitted voltage even if two redundant circuitries fail to do so due to any of a variety of error conditions or faults. Thus, as few as three voltage limiting circuit stages may provide the triple redundancy needed for hazardous environments; however the techniques described herein may, in other example embodiments, be extended to voltage limiting circuities that may collectively include more than the three stages that are herein described and illustrated.

Still with reference to the illustrated adaptive ACL circuitry $140_1$, this includes voltage control circuitry 148 which controls a voltage difference provided across RADIO+/− terminals 149 and 150 of the power-consuming electronics device 108 (by creating a voltage reduction across the voltage control element 126). The adaptive ACL circuitry $140_1$ also includes active current limit circuitry 152 which is operable to monitor flow for the path 122 and, when a certain current level threshold (as determined within the active current limit circuitry 152) becomes exceeded, causes the voltage control element 126 to open the path 122. The voltage control circuitry 148 controls the voltage control element 126 (for example, the voltage control circuitry 148 controls a Voltage Drain-to Source ($V_{DS}$) drop for a Field Effect Transistor (FET), where the voltage drop across the voltage control element 126 is understood to depend upon an output requirement as established by RADIO+ and RADIO−).

Still with reference to the battery circuitry 112, this also includes the enable circuitry 118 which, in addition to the already described input 116, includes inputs 154 and 156, as well as output 158. Regarding the input 154, this is coupled to ENABLE pin 162 of the power-consuming electronics device 108. Regarding the input 156, this is coupled to RADIO DATA pin 164 of the power-consuming electronics device 108. Regarding the output 158, this is coupled to the active current limit circuitry 152. The enable circuitry 118 is operable to selectively cut the voltage supply to the adaptive ACL circuitry 140i. More details of the enable circuitry 118 are later herein described.

Still with reference to the battery circuitry 112, this also includes three voltage feedback circuitries $170_1$, $170_2$, $170_3$, each of which are coupled to a respective one of the adaptive ACL circuitries $140_1$, $140_2$, $140_3$. Finally, the battery circuitry 112 also includes the isolation resistance 130 that is coupled in series with three series-connected diodes $180_1$, $180_2$ and $180_3$.

Figure 2A:
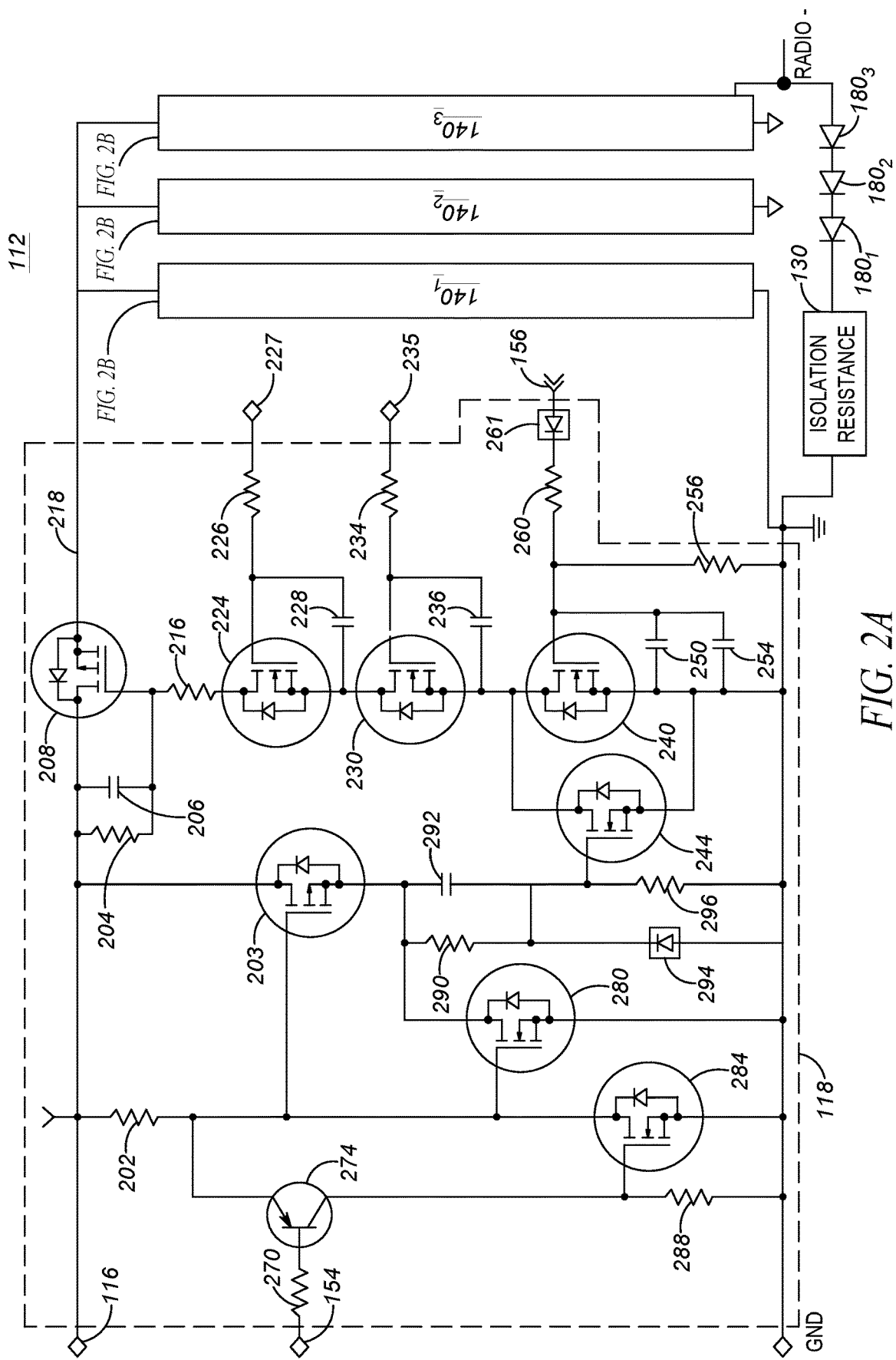
FIG. 2A is a circuit schematic diagram providing additional detail in relation to battery circuitry of the electronics apparatus of FIG. 1.

Reference is now made to FIG. 2A. FIG. 2A is a circuit schematic diagram providing additional detail in relation to battery circuitry 112 of the electronics apparatus 100. At the top left of this schematic diagram is the input 116 which is provided the CELL+ voltage from the voltage source 104. The input 116 is coupled to a first terminal of a resistor 202 (1 MΩ in one example), a source of PFET transistor 203, a first terminal of a resistor 204 (1 MΩ in one example), a first terminal of a capacitor 206 (100 pF in one example), and a source of PFET transistor 208. Regarding the PFET transistor 208, the gate of this transistor is coupled to a first terminal of a resistor 216 (100 kΩ in one example), and the drain of this transistor is coupled to a node 218, which is in turn coupled to inputs of the adaptive ACL circuitries $140_1$, $140_2$, $140_3$ to provide a modified version of the CELL+ voltage.

The resistor 216 also includes a second terminal which is coupled to the drain of an NFET transistor 224. The gate of the NFET transistor 224 is coupled to a first terminal of a resistor 226 (100 kΩ in one example), and a second terminal the resistor 226 is in turn coupled to a connection 227 to a primary cell undervoltage protection provided by a cell safety IC. The gate of the NFET transistor 224 is also coupled to a first terminal of capacitor 228 (100 pF in one example). A second terminal of the capacitor 228 is coupled to the source of NFET transistor 224 and a drain of NFET transistor 230. The gate of the NFET transistor 230 is coupled to a first terminal of a resistor 234 (100 kΩ in one example), and a second terminal the resistor 234 is in turn coupled to a connection 235 to a secondary cell undervoltage protection provided by the cell safety IC mentioned above. The gate of the NFET transistor 230 is also coupled to a first terminal of capacitor 236 (100 pF in one example).

Continuing on, the illustrated enable circuitry 118 also includes two NFET transistors 240 and 244 coupled in parallel. The drains of the NFET transistors 240 and 244 are coupled to a second terminal of the capacitor 236 and a source of the NFET transistor 230. The gate of the NFET transistor 240 is coupled to a first terminal of a capacitor 250 (100 pF in one example), a first terminal of a capacitor 254 (0.47 μF in one example), a first terminal of a resistor 256 (1 MΩ in one example) and a first terminal of a resistor 260 (1 MΩ in one example), which in turn has a second terminal coupled to the input 156 via a diode 261. The second terminal of the resistor 256, the second terminals of the capacitors 250, 254 and the sources of the NFET transistors 240 and 244 are all coupled to ground.

Continuing on, the illustrated enable circuitry 118 also includes a resistor 270 (1 MΩ in one example) have a first terminal coupled to the input 154 (shown in FIG. 1 as coupled to the ENABLE pin 162 of the power-consuming electronics device 108). A second terminal of the resistor 270 is coupled to a base of PNP bipolar junction transistor 274. The emitter of the transistor 274 is coupled to a second terminal of the resistor 202, a gate of the PFET transistor 203, a gate of NFET transistor 280 and a drain of NFET transistor 284. The gate of the NFET transistor 284 is coupled to a first terminal of resistor 288 (1 MΩ in one example) as well as a collector of the transistor 274. A second terminal of the resistor 288 and the source of the NFET transistor 284 are both coupled to ground.

The illustrated enable circuitry 118 also includes a resistor 290 (100 kΩ in one example) and a capacitor 292 (0.47 μF in one example) coupled in parallel. First terminals of the resistor 290 and the capacitor 292 are coupled to a drain of the PFET transistor 203 and a drain of the NFET transistor 280.

The illustrated enable circuitry 118 also includes a diode 294 and a resistor 296 (100 in one example) coupled in parallel. First terminals of the diode 294 and the resistor 296 are coupled to a gate of the NFET transistor 244 and second terminals of the resistor 290 and the capacitor 292. Second terminals of the diode 294 and the resistor 296 are coupled to ground.

Figure 2B:
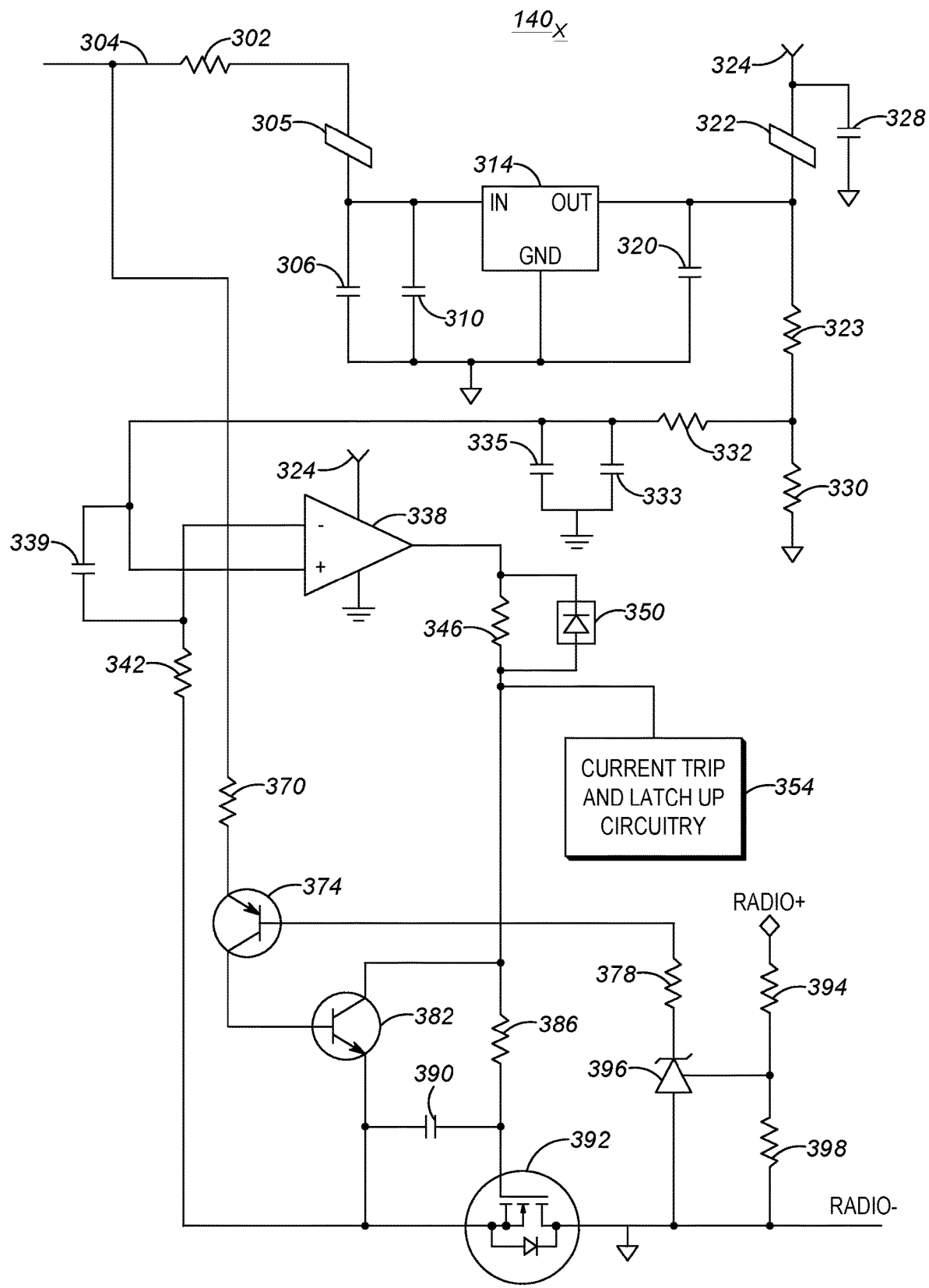
FIG. 2B is a circuit schematic diagram providing additional detail in relation to adaptive ACL circuitry of the battery circuitry of FIG. 2A.

Reference is now made to FIG. 2B. FIG. 2B is a circuit schematic diagram providing additional detail in relation to one of the adaptive ACL circuitries $140_1$-$140_3$ (labelled as $140_x$ in this figure). At the top left of the schematic a resistor 302 (1.4 kΩ in one example) has a first terminal 304 coupled to the node 218 (FIG. 2A). A second terminal of the resistor 302 is coupled to a first terminal of a ferrite bead 305 which, as will be apparent to one skilled in the art, is for the purpose of Radio Frequency (RF) filtering. A second terminal of the ferrite bead 305 is coupled to first terminals of two capacitors 306 and 310 coupled in parallel. The second terminal of the ferrite bead 305 is also coupled to an IN terminal of a comparator IC 314. Illustrated OUT terminal of the comparator IC 314, which provides a reference voltage, is coupled to a first terminal of a capacitor 320 (100 pF in one example), a first terminal of ferrite bead 322 (which again is for the purpose of RF filtering) and a first terminal of resistor 323 (332 kΩ in one example). A second terminal of the ferrite bead 322 is coupled to local power supply 324 as well as a first terminal of a capacitor 328 (0.1 μF in one example).

Continuing on, the illustrated ACL circuitry $140_x$ also includes a resistor 330 (24 kΩ in one example) having a first terminal connected to a second terminal of the resistor 323 and a first terminal of a resistor 332 (1 kΩ in one example). Also, a second terminal of the resistor 332 is coupled to first terminals of two capacitors 333 and 335 coupled in parallel (the capacitor 333 is 0.1 μF in one example, and the capacitor 335 is 100 pF in one example), and second terminals of the two capacitors 333 and 335 are coupled to ground. The second terminal of the resistor 332 is also coupled to a first terminal of capacitor 339 (100 pF in one example) and a non-inverting terminal of op-amp 338. It will be understood that the voltage this non-inverting terminal is not fixed, and will vary in order to provide the suitable current level threshold (which was previously herein mentioned and which is also not fixed). The op-amp 338 is powered by the local power supply 324, and an inverting terminal of the op-amp 338 is coupled to the second terminal of the capacitor 339 as well as a first terminal of resistor 342 (1 kΩ in one example).

Still with reference to the op-amp 338, an output of the op-amp 338 is coupled to first terminals of a resistor 346 (1.5 kΩ in one example) and a diode 350 (connected in parallel with the resistor 346). It will be understood that the comparator IC 314 and the op-amp 338 work together cooperatively to provide the function of the active current limit circuitry 152. In terms of operation of the op-amp 338, if the inverting input is higher than the non-inverting input, then the output is high. In the alternative, if the inverting input is lower than the non-inverting input, then the output is low.

With reference again to the resistor 346 and the diode 350, second terminals of these circuit elements are coupled to current trip and latch up circuitry 354. The current trip and latch up circuitry 354 is provided in order to: i) prevent an oscillation scenario (i.e. switching ON and OFF continuously) in relation to an NFET transistor 392 (which is the voltage control element 126); and ii) function as a power limiting circuit in a case where the NFET transistor 392 may become faulted to resistive mode. Additional implementation details of the current trip and latch up circuitry 354 will be readily apparent to one skilled in the art and thus are not herein provided in order to avoid inclusion of details tangential to inventive aspects of example embodiments.

With reference again to the top left of the schematic, in addition to the resistor 302 being coupled to the node 218 (FIG. 2A), a first terminal of resistor 370 (49.9 kΩ in one example) is also coupled to this node. A second terminal of the resistor 370 is coupled to an emitter of a PNP bipolar junction transistor 374. A base of the transistor 374 is coupled to a first terminal of resistor 378, and a collector of the transistor 374 is coupled to the base of an NPN bipolar junction transistor 382. The transistors 374 and 382 form part of the voltage control circuitry 148 and work together cooperatively as part of the function of the voltage control circuitry 148 in monitoring the battery output and operating responsively to effect change of that output by controlling adjustment of the voltage control element 126.

Coupled to a collector of the transistor 382 is a second terminal of the resistor 346 and a first terminal of a resistor 386 (220Ω in one example). Coupled to an emitter of the transistor 382 is a first terminal of capacitor 390, a source of NFET transistor 392, a second terminal of the resistor 342, and the second terminal 120 of the voltage source 104. A gate of the NFET transistor 392 is coupled to a second terminal of the resistor 386. A drain of the NFET transistor 392 is coupled to an anode terminal of an adjustable shunt regulator 396 as well as a first terminal of a resistor 398 (49.9 kΩ in one example). In accordance with at least one example embodiment, the voltage feedback circuitry 170 (FIG. 1) is formed of the resistors 378, 394, 398 and the shunt regulator 396.

The adjustable shunt regulator 396 includes a cathode terminal coupled to a second terminal of the resistor 378. The adjustable shunt regulator 396 also includes a reference terminal coupled to a second terminal of the resistor 398 and a first terminal of a resistor 394 (49.9 kΩ in one example). A second terminal of the resistor 394 is coupled to RADIO+.

Figure 3:
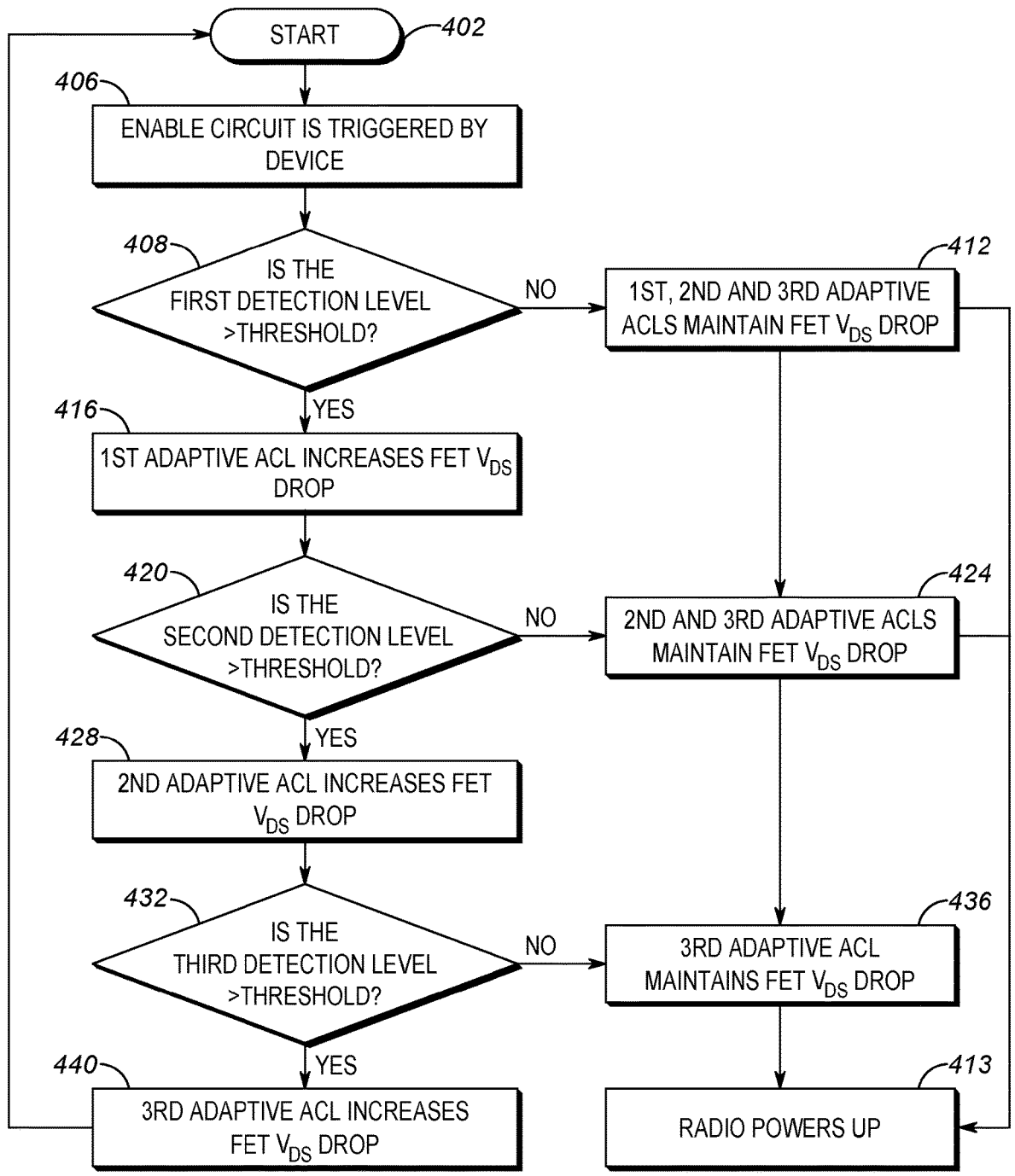
FIG. 3 is a flow chart illustrating a method for adaptive ACL protection in accordance with an example embodiment.

Reference is now made to FIG. 3. FIG. 3 is a flow chart illustrating a method 400 for adaptive ACL protection in accordance with an example embodiment. After "START" 402, an enable circuit (for example, the enable circuitry 118) is triggered (406) by a device (for example, the power-consuming electronics device 108) when an output voltage from the voltage source 104 exceeds a maximum permitted voltage for device operation in a hazardous environment. Next, a determination is made (408) as to whether or not a first detection level threshold is exceeded. If no, then each of the first, second and third adaptive ACL circuitries $140_1$, $140_2$ and $140_3$ maintain (412) the respective FET $V_{DS}$ drop (in FIG. 2B this is the $V_{DS}$ drop across the NFET transistor 392, noting that there is a total of three NFET transistors across the three adaptive ACL circuitries $140_1$, $140_2$ and $140_3$). Following the action 412, the radio powers up (413).

With reference again to the decision action 408, if the first detection level threshold is exceeded, then the first adaptive ACL circuitry $140_1$, increases (416) its respective FET $V_{DS}$ drop. Following the action 416, a determination is made (420) as to whether or not a second detection level threshold is exceeded. If no, then each of the second and third adaptive ACL circuitries $140_2$ and $140_3$ maintain (424) the respective FET $V_{DS}$ drop. Following the action 424, the radio powers up (413).

With reference again to the decision action 420, if the second detection level threshold is exceeded, then the second adaptive ACL circuitry $140_2$, increases (428) its respective FET $V_{DS}$ drop. Following the action 428, a determination is made (432) as to whether or not a third detection level threshold is exceeded. If no, then the third adaptive ACL circuitries $140_3$ maintains (436) the respective FET $V_{DS}$ drop. Following the action 436, the radio powers up (413).

With reference again to the decision action 432, if the third detection level threshold is exceeded, then the third adaptive ACL circuitry $140_3$, increases (440) its respective FET $V_{DS}$ drop. Following the action 440, the radio does not immediately power up; however repeating of the method 400 is contemplated (i.e. return to the START 402 following the action 440).

Figure 4:
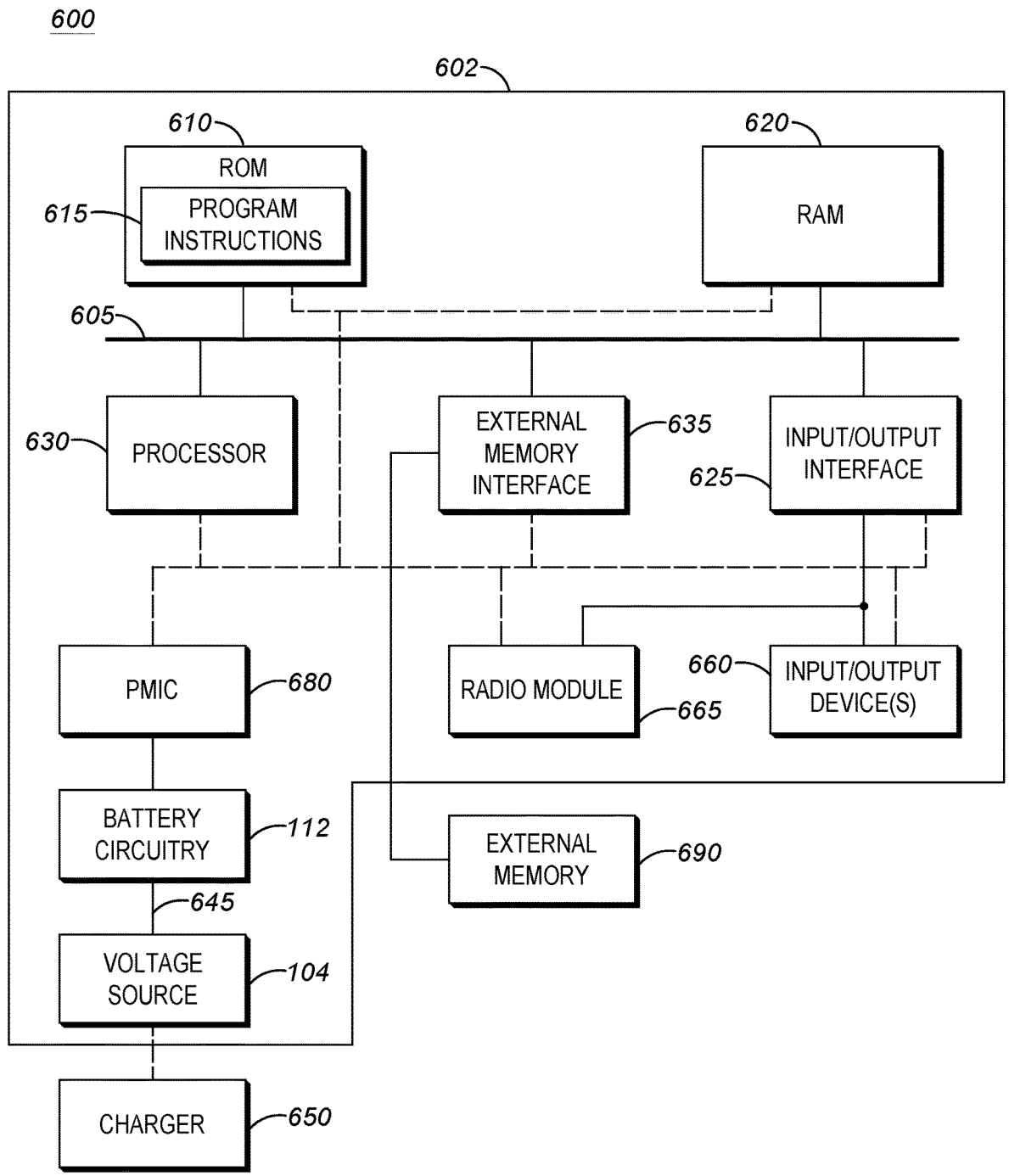
FIG. 4 is a block diagram illustrating a portable electronic communication device in accordance with an example embodiment.

Reference is now made to FIG. 4. FIG. 4 is a block diagram illustrating a portable electronic communication device 600 in accordance with an example embodiment. The illustrated portable electronic communication device 600 includes, amongst other things, the voltage source 104, the battery circuitry 112, a device housing 602, an analog radio module 665, and one or more input/output devices 660. The portable electronic communication device 600 may be any type of portable electronic communication device for which power can be supplied, at least at certain times, by the voltage source 104 (illustrated within the device housing 602; however outside of the device housing 602 is also contemplated). At certain times, the voltage source 104 may be coupled to a charger 650 to charge the battery cells of the voltage source 104. In some examples, the portable electronic communication device 600 may be a multifunction radio, a land mobile radio, a mobile telephone, or another type of portable electronic communication device configured for operating in a hazardous environment. In other examples, the portable electronic communication device 600 may be or include a laptop computer, a tablet computer, a smart phone, a lighting system, a sound system, a wire-free security camera, or some other type of portable electronic device.

In some examples, the voltage source 104 may include multiple battery cells with a combined maximum voltage rating that may exceed a predefined maximum permitted voltage for operation of the portable electronic communication device 600 in a hazardous environment. In various examples, the voltage source 104 may provide electrical power an electronic processor 630, the analog radio module 665, and the input/output devices 660 as the load. In some examples, a digital signal indicating a current or voltage measurement taken within the voltage source 104 may be selectively provided to the electronic processor 630 over one or more data lines. In some examples, other operating parameters of the battery pack may be obtained by software operating on the electronic processor 630. For instance, in some examples the operating parameters of the voltage source 104, or of a particular battery cell forming part of same, may be read from a memory (that stores battery data) integrated into the voltage source 104. The operating parameters of the voltage source 104 (or a battery cell of same) obtainable by the electronic processor 630 may include, but are not limited to, a state-of-charge of the voltage source or a battery cell thereof, a battery cell type, a battery pack or cell topology, the available capacity of the voltage source or a battery cell thereof, a peak or present charging capacity of the voltage source or a battery cell thereof, a nominal voltage range for the voltage source or a battery cell thereof, the temperature of the voltage source or a battery cell thereof, an indication of the age of the voltage source or a battery cell thereof, the number of charge-discharge cycles the voltage source or battery cell has experienced, or a measure of impedance for the voltage source or a battery cell thereof.

As illustrated in this example embodiment, the portable electronic communication device 600 may include a Read Only Memory (ROM) 610, a Random Access Memory (RAM) 620, the electronic processor 630, a Power Management Integrated Circuit (PMIC) 680, the battery circuitry 112, an input/output interface 625, and an external memory interface 635, all of which may be coupled to a system bus 605 through which they communicate with each other. In various examples, electronic processor 630 may include a microprocessor, a microcontroller, a system-on-chip, a field-programmable gate array, a programmable mixed-signal array or, in general, any system or sub-system that includes nominal memory and that is capable of executing a sequence of instructions in order to control hardware elements of the portable electronic communication device 600. In this example embodiment, the ROM 610 stores program instructions 615, at least some of which may be executed by the electronic processor 630 to implement, in conjunction with the analog radio module 665 and/or the input/output devices 660, various functions of the portable electronic communication device 600. In some examples, the program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In this example embodiment, the RAM 620 may, from time to time, store data representing battery data or operating parameters of the voltage source 104, or of particular battery cells thereof, to be used in performing various power management functions on behalf of the portable electronic communication device 600. In some examples, the RAM 620 may also store data used in performing other functions of the portable electronic communication device 600.

In some examples, the battery circuitry 112 receives electrical power 645 from the voltage source 104 and may, when necessary, reduce the voltage at which the electrical power is supplied to other elements of the portable electronic communication device 600 below a predefined maximum permitted voltage for operating the portable electronic communication device 600 in a hazardous environment.

In this example embodiment, the input/output interface 625 may include one or more analog input interfaces, such as one or more A/D convertors, or digital interfaces for exchanging signals or data with the analog radio module 665. The input/output interface 625 may also include interfaces through which the electronic processor 630 may be coupled to other elements of the portable electronic communication device 600. For example, the electronic processor 630 may be indirectly connected to the input/output devices 660 that implement other functionality features of the portable electronic communication device 600, such as a keyboard, a mouse, a touch panel, a switch, a microphone, a video camera, a display, a speaker, one or more sensors, and the like over the input/output interface 625. In the illustrated example embodiment, the electronic processor 630 is shown indirectly connected to the analog radio module 665 and the input/output devices 660.

Operation of the analog radio module 665 to initiate and establish wireless connection of the portable electronic communication device 600 to a Radio Access Network (RAN) is contemplated. RANs may operate according to an industry standard land mobile radio (LMR) or cellular protocol such as, for example, the Project 25 (P25) standard defined by the Association of Public Safety Communications Officials International (APCO), the TErrestrial Trunked RAdio (TETRA) standard defined by the European Telecommunication Standards Institute (ETSI), the Digital Private Mobile Radio (dPMR) standard also defined by the ETSI, the Digital Mobile Radio (DMR) standard also defined by the ETSI, the LTE (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoW), or a PTT over IP (PoIP) application may be implemented.

Still with reference to FIG. 4, the external memory interface 635 may include one or more interfaces through which the portable electronic communication device 600 may be coupled to an external memory 690. The external memory 690 may include, for example, a Hard-Disk Drive (HDD), an optical disk drive such as a Compact Disk (CD) drive or Digital Versatile Disk (DVD) drive, a Solid State Drive (SSD), a tape drive, a flash memory drive, or a tape drive, to name a few.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing a selectively reduced voltage to a portable electronic device, the method comprising:
   making a determination, prior to supplying electrical power from a voltage source to the portable electronic device:
      that an output voltage from the voltage source exceeds a predefined maximum permitted voltage for operation of the portable electronic device in a hazardous environment; or
      that the output voltage from the voltage source is at or below the predefined maximum permitted voltage;
   when the determination is that the output voltage from the voltage source exceeds the predefined maximum permitted voltage:
      enabling a plurality of circuitries, including an adaptive active current limiting circuitry, to derive the reduced voltage from the output voltage, wherein the reduced voltage is at least at or below the predefined maximum permitted voltage; and
      supplying the reduced voltage to the portable electronic device; and
   when the determination is that the output voltage from the voltage source is at or below the predefined maximum permitted voltage:
      providing the output voltage to the portable electronic device without voltage reduction; and
      fully turning off the plurality of circuitries.

2. The method as claimed in claim 1 wherein the portable electronic device is a communication device.

3. The method as claimed in claim 2 wherein the communication device is a land mobile radio.

4. The method as claimed in claim 1 wherein the adaptive active current limiting circuitry includes a voltage control element that comprises at least one FET transistor having a dynamically changeable Voltage Drain-to Source ($V_{DS}$) drop.

5. The method as claimed in claim 4 wherein a difference in the output voltage and the reduced voltage varies in relation to an amount of the $V_{DS}$ drop.

6. The method as claimed in claim 5 wherein the adaptive active current limiting circuitry further includes voltage control circuitry that controls the amount of the $V_{DS}$ drop.

7. The method as claimed in claim 1 wherein the enabling of the plurality of circuitries includes enabling at least two additional adaptive active current limiting circuitries, the adaptive active current limiting circuitry and the two additional adaptive active current limiting circuitries each including a respective voltage control element that comprises at least one FET transistor having a dynamically changeable $V_{DS}$ drop.

8. The method as claimed in claim 7 wherein a difference in the output voltage and the reduced voltage varies in relation to a summation amount of three $V_{DS}$ drops provided by the adaptive active current limiting circuitry and the two additional adaptive active current limiting circuitries.

9. The method as claimed in claim 1 further comprising fully turning off the plurality of circuitries after the portable electronic device is turned off.

10. The method as claimed in claim 1 further comprising fully turning off the plurality of circuitries after the portable electronic device has completed a powering down sequence.

11. Apparatus having a housing to contain a voltage source that provides an output voltage, the apparatus comprising:
   a portable electronic device sized to be contained within the housing; and
   battery circuitry including enable circuitry and adaptive active current limiting circuitry, the battery circuitry being configured to provide either the output voltage or a reduced voltage, and
   the enable circuitry being electrically connectable to the voltage source, the enable circuitry configured to make a determination, prior to the battery circuitry supplying electrical power from the voltage source to the portable electronic device:
      that the output voltage from the voltage source exceeds a predefined maximum permitted voltage for operation of the portable electronic device in a hazardous environment; or
      that the output voltage from the voltage source is at or below the predefined maximum permitted voltage, and
   the adaptive active current limiting circuitry being coupled to the enable circuitry and configured to be:
      fully turned off when disabled by the enable circuitry; and when the enable circuitry determines that the output voltage from the voltage source exceeds the predefined maximum permitted voltage, generate the reduced voltage from the output voltage, wherein the reduced voltage is at least at or below the predefined maximum permitted voltage.

12. The apparatus as claimed in claim 11 wherein the portable electronic device is a communication device.

13. The apparatus as claimed in claim 12 wherein the communication device is a land mobile radio.

14. The apparatus as claimed in claim 11 wherein the adaptive active current limiting circuitry includes a voltage control element that comprises at least one FET transistor having a dynamically changeable $V_{DS}$ drop.

15. The apparatus as claimed in claim 14 wherein a difference in the output voltage and the reduced voltage varies in relation to an amount of the $V_{DS}$ drop.

16. The apparatus as claimed in claim 15 wherein the adaptive active current limiting circuitry further includes voltage control circuitry configured to control the amount of the $V_{DS}$ drop.

17. The apparatus as claimed in claim 11 wherein the battery circuitry further includes at least two additional adaptive active current limiting circuitries, the adaptive active current limiting circuitry and the two additional adaptive active current limiting circuitries each including a respective voltage control element that comprises at least one FET transistor having a dynamically changeable $V_{DS}$ drop.

18. The apparatus as claimed in claim 17 wherein a difference in the output voltage and the reduced voltage varies in relation to a summation amount of three $V_{DS}$ drops providable by the adaptive active current limiting circuitry and the two additional adaptive active current limiting circuitries.

19. The apparatus as claimed in claim 11 wherein battery circuitry further includes an isolation resistance and a plurality of series connected diodes coupled between an input of the adaptive active current limiting circuitry and a negative voltage terminal of the portable electronic device.

* * * * *